(12) United States Patent
Ortiz

(10) Patent No.: US 9,937,897 B1
(45) Date of Patent: Apr. 10, 2018

(54) WIPER BLADE-LIFTING SYSTEM

(71) Applicant: Luis Ortiz, Lowell, MA (US)

(72) Inventor: Luis Ortiz, Lowell, MA (US)

(*) Notice: Subject to any disclaimer, the term of this patent is extended or adjusted under 35 U.S.C. 154(b) by 0 days.

(21) Appl. No.: 15/666,024

(22) Filed: Aug. 1, 2017

(51) Int. Cl.
*B60S 1/34* (2006.01)
*B60S 1/04* (2006.01)
*B60S 1/08* (2006.01)
*B60S 1/26* (2006.01)
*F16H 19/04* (2006.01)

(52) U.S. Cl.
CPC ............. *B60S 1/0455* (2013.01); *B60S 1/08* (2013.01); *B60S 1/26* (2013.01); *B60S 1/3413* (2013.01); *B60S 1/3463* (2013.01); *F16H 19/04* (2013.01)

(58) Field of Classification Search
CPC .... B60S 1/0455; B60S 1/3411; B60S 1/3413; B60S 1/3422; B60S 1/3463; B60S 1/347; B60S 1/3472
USPC ............................ 15/250.19, 250.16, 250.17
See application file for complete search history.

(56) References Cited

U.S. PATENT DOCUMENTS

| | | | | |
|---|---|---|---|---|
| 2,295,621 A * | 9/1942 | Zaiger | ................. | B60S 1/36 15/250.202 |
| 2,784,438 A * | 3/1957 | Petersen | ................ | B60S 1/08 15/250.19 |
| 2,850,755 A * | 9/1958 | Deibel | ................. | B60S 1/34 15/250.34 |
| 4,962,564 A | 10/1990 | Onda | | |
| D330,181 S | 10/1992 | Charet | | |
| 5,636,407 A * | 6/1997 | Len | ................. | B60S 1/0477 15/250.19 |
| 6,253,409 B1 | 7/2001 | Terai | | |
| 6,471,784 B2 * | 10/2002 | Lahti | ................. | B60S 1/34 134/42 |
| 6,588,046 B1 * | 7/2003 | Lee | ................. | B60S 1/0455 15/250.001 |
| 6,622,338 B1 * | 9/2003 | Chen | ................. | B60S 1/0455 15/250.16 |
| 6,675,430 B2 | 1/2004 | Harmamoto | | |
| 7,703,169 B2 | 4/2010 | Cakmak | | |

* cited by examiner

*Primary Examiner* — Gary Graham
(74) *Attorney, Agent, or Firm* — Kyle A. Fletcher, Esq.

(57) ABSTRACT

The wiper blade-lifting system comprises a wiper arm with a motorized mechanism to cause the wiper blade to bend at a hinge point responsive to the presence of electrical power. The wiper blade-lifting system is useful to lift a wiper blade off the surface of a windshield when ice or freezing rain is anticipated, so that the wiper blade does not become frozen in place against the surface of the windshield. A second activation of the wiper blade-lifting system using electrical power of the opposite polarity causes the wiper blade to straighten and place the wiper blade back in contact with the windshield. The application of electrical power to the wiper blade-lifting system may be under control of an interior lift control or, in some embodiments, a blade lift remote control.

16 Claims, 5 Drawing Sheets

WIPER BLADE-LIFTING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicular accessories, more specifically, a wiper blade-lifting system.

SUMMARY OF INVENTION

The wiper blade-lifting system comprises a wiper arm with a motorized mechanism to cause the wiper blade to bend at a hinge point responsive to the presence of electrical power. The wiper blade-lifting system is useful to lift a wiper blade off the surface of a windshield when ice or freezing rain is anticipated, so that the wiper blade does not become frozen in place against the surface of the windshield. A second activation of the wiper blade-lifting system using electrical power of the opposite polarity causes the wiper blade to straighten and place the wiper blade back in contact with the windshield. The application of electrical power to the wiper blade-lifting system may be under control of an interior lift control or, in some embodiments, a blade lift remote control.

An object of the invention is to provide a system capable of lifting a wiper blade from a windshield and restoring the wiper blade to a position against the windshield.

Another object of the invention is to allow activation of the wiper blade-lifting system from a control located within the passenger compartment of a vehicle.

A further object of the invention is to allow remote activation of the wiper blade-lifting system.

These together with additional objects, features and advantages of the wiper blade-lifting system will be readily apparent to those of ordinary skill in the art upon reading the following detailed description of the presently preferred, but nonetheless illustrative, embodiments when taken in conjunction with the accompanying drawings.

In this respect, before explaining the current embodiments of the wiper blade-lifting system in detail, it is to be understood that the wiper blade-lifting system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wiper blade-lifting system.

It is therefore important that the claims be regarded as including such equivalent construction insofar as they do not depart from the spirit and scope of the wiper blade-lifting system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive. Throughout this document the terms "battery pack", "battery", and "batteries" may be used interchangeably to refer to one or more wet or dry cells or batteries of cells that provide DC power to the invention.

References to recharging or replacing batteries may be construed to mean recharging or replacing individual cells, individual batteries of cells, or a package of multiple battery cells as is appropriate for any given battery technology that may be used. As used herein, the word "control" is intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the word "coupled", means connected, either directly or indirectly; the word coupled does not necessarily imply a mechanical connection. Throughout this document references to 'wire', 'wires', or 'wiring' may describe and/or show a single conductor when, in fact, two conductors are required to power a subsystem; a convention used herein is to not show the common return conductor to which all electrical subsystems are connected—this common return conductor is a continuous electrical path and does not pass through any type of switch or other electrical component other than the possibility of passing through one or more connectors.

Figure 1:
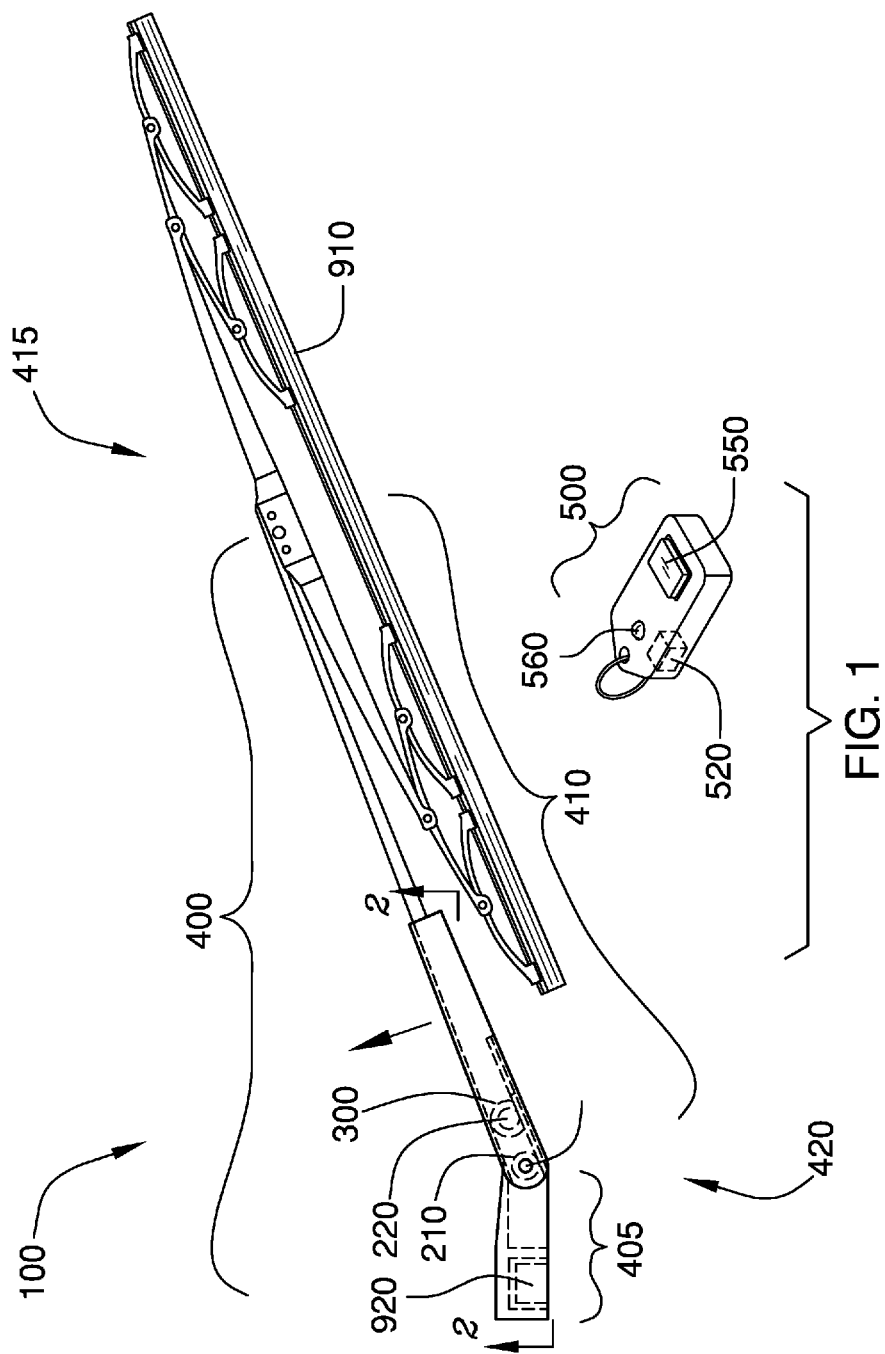
FIG. 1 is a top view of an embodiment of the disclosure.
Figure 2:
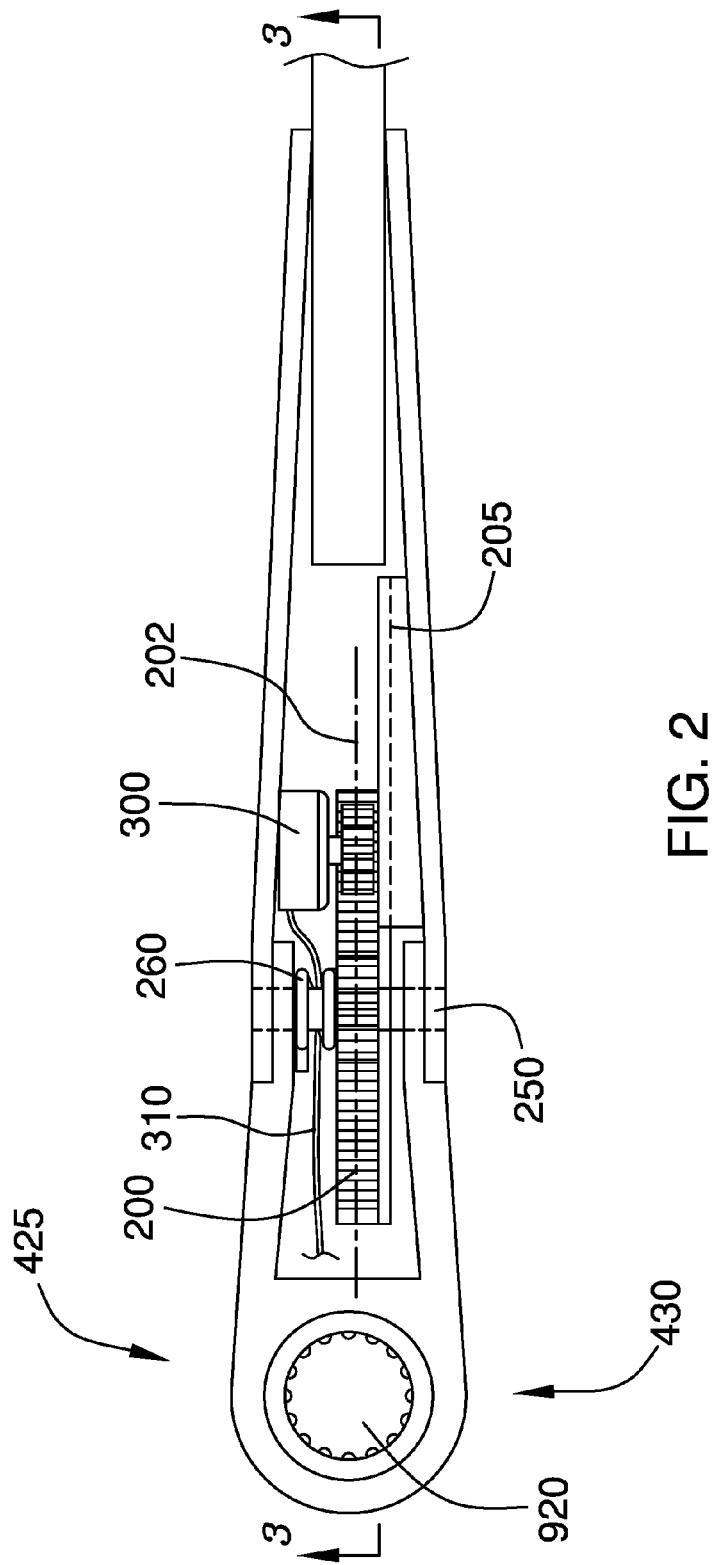
FIG. 2 is a cross-sectional view of an embodiment of the disclosure across 2-2 as shown in FIG. 1.
Figure 3:
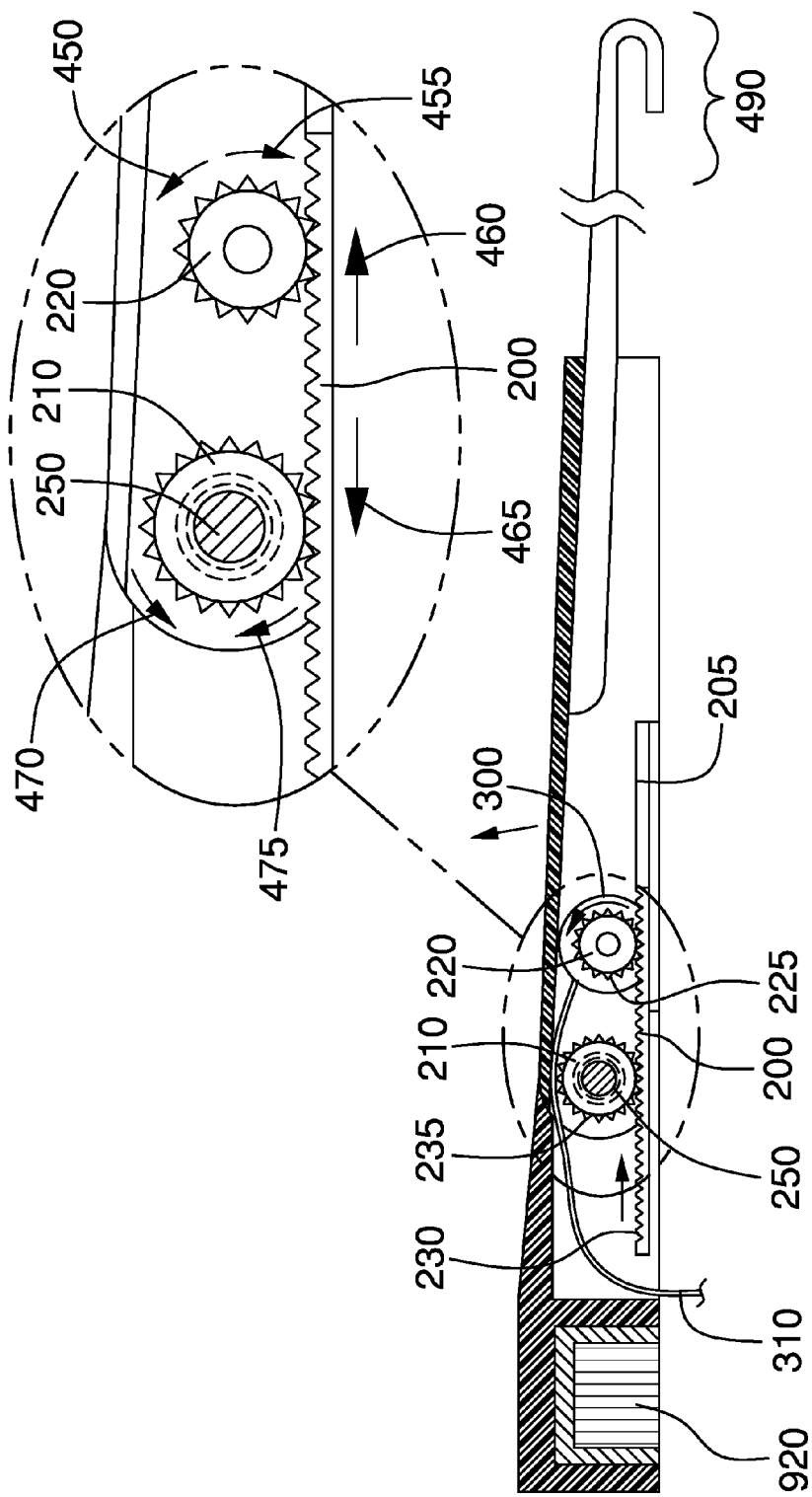
FIG. 3 is a cross-sectional view of an embodiment of the disclosure across 3-3 as shown in FIG. 2.
Figure 4:
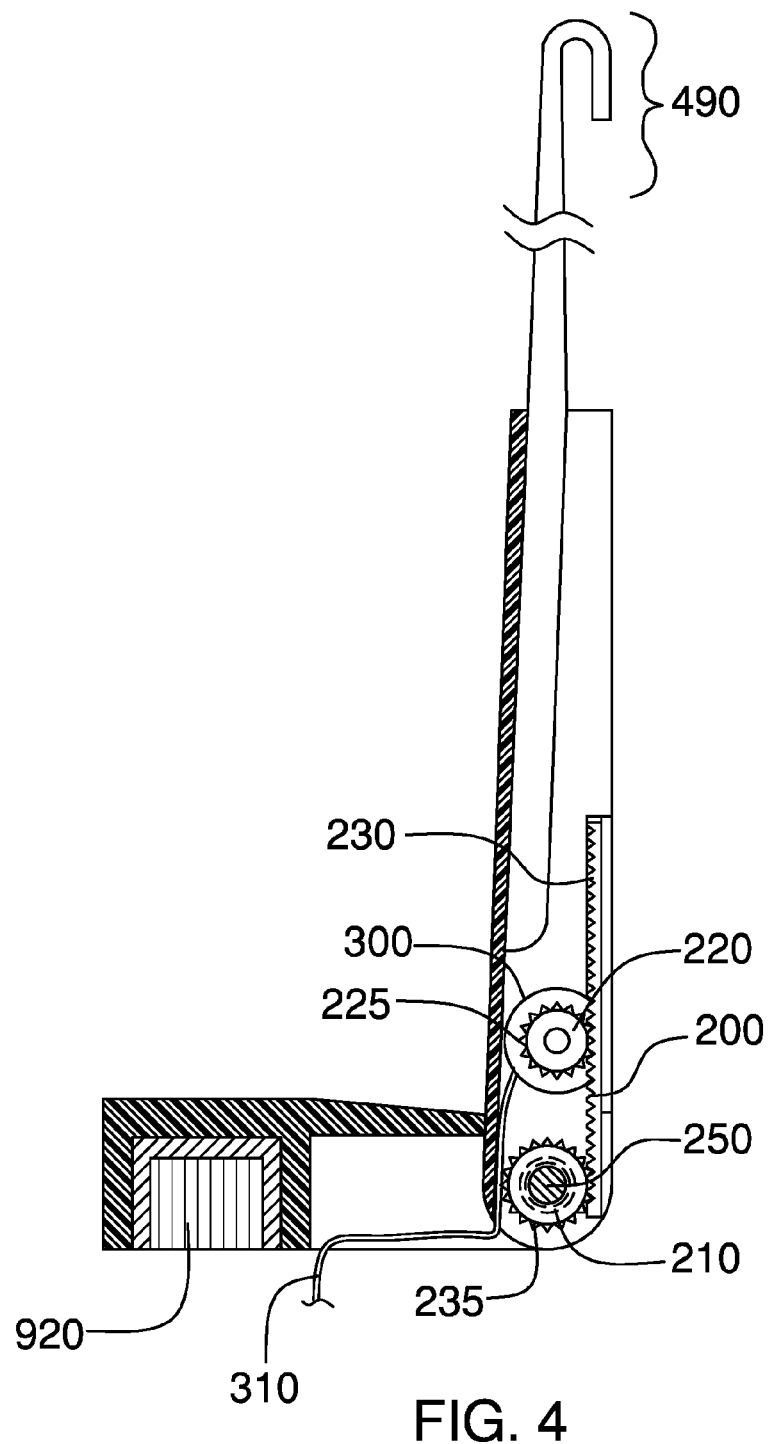
FIG. 4 is a cross-sectional view of an embodiment of the disclosure analogous to FIG. 3 when the wiper blade-lifting system is lifting the wiper blade away from the windshield.
Figure 5:
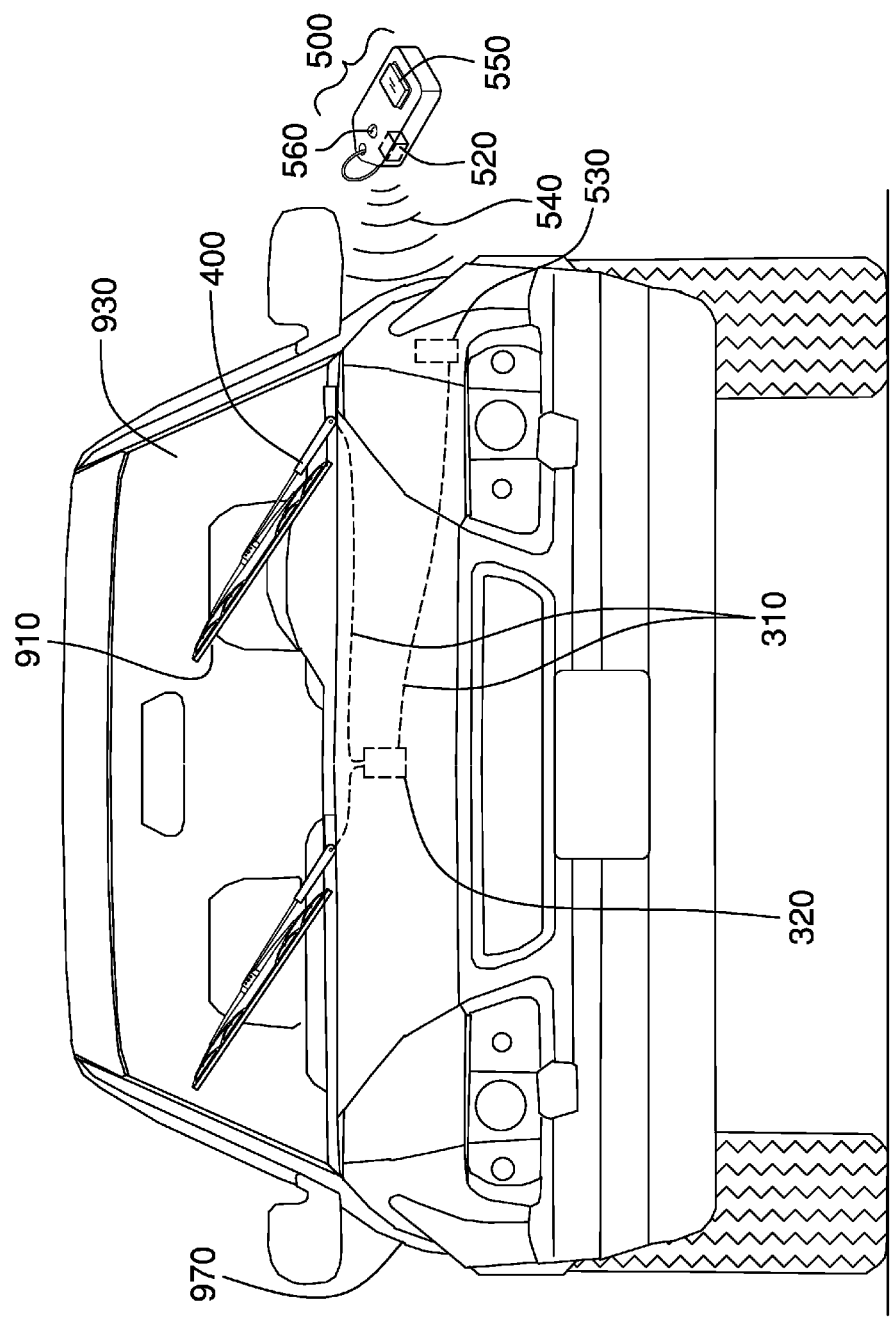
FIG. 5 is view of an embodiment of the disclosure showing the wiper blade-lifting system in use on an automobile.

Detailed reference will now be made to a first potential embodiment of the disclosure, which is illustrated in FIGS. 1 through 7.

The wiper blade-lifting system 100 (hereinafter invention) comprises a wiper arm 400, a motor 300, a driven gear 220, a pivot gear 210, a rack gear 200, a pivot pin 250, a rack gear guide track 205, a torsion spring 260 and an interior lift control 320. Activation of the motor 300 causes the wiper arm 400 to hinge at the pivot pin 250 or to straighten. Hinging of the wiper arm 400 may result in a wiper blade 910 being lifted away from a windshield 930 while straightening of the wiper arm 400 may result in the wiper blade 910 being brought into contact with the windshield 930. Lifting the wiper blade 910 away from the windshield 930 may preserve the life of the windshield 930 and may prevent the wiper blade 910 from becoming stuck to the windshield 930 during icy weather conditions.

The wiper arm 400 comprises a proximal portion of the wiper arm 405 and a distal portion of the wiper arm 410. The proximal portion of the wiper arm 405 is coupled to a wiper mounting post 920 which moves in an oscillatory manner driven by a wiper motor (not illustrated in the figures) and, in some vehicles, a wiper transmission (not illustrated in the figures). The distal portion of the wiper arm 410 couples to the wiper blade 910 via a blade attachment interface 490. The proximal portion of the wiper arm 405 and the distal portion of the wiper arm 410 are hingedly coupled to each other at the pivot pin 250.

The wiper arm 400 has a front 415, a rear 420, a top 425, and a bottom 430. The pivot pin 250 is coupled to the top 425 of the distal portion of the wiper arm 410 and to the bottom 430 of the distal portion of the wiper arm 410. The pivot pin 250 passes through the top 425 of the proximal portion of the wiper arm 405 and through the bottom 430 of the proximal portion of the wiper arm 405 but is not coupled to the proximal portion of the wiper arm 405, therefore the proximal portion of the wiper arm 405 is free to pivot with respect to the distal portion of the wiper arm 410.

The motor 300 may be coupled to the top 425 of the distal portion of the wiper arm 410 at an interior location of the distal portion of the wiper arm 410. Wiring 310 provides power to the motor 300 when the invention 100 is activated. The polarity of the applied power determines the direction of rotation of the motor 300.

The driven gear 220 is coupled to the shaft of the motor 300. Driven gear teeth 225 at the periphery of the driven gear 220 engage with rack gear teeth 230 on the rack gear 200. The pivot gear 210 is coupled to the pivot pin 250. Pivot gear teeth 235 at the periphery of the pivot gear 210 engage with the rack gear teeth 230 on the rack gear 200.

The rack gear 200 is a linear arrangement of the rack gear teeth 230. The rack gear 200 may be interposed between the rack gear guide track 205 and the driven gear 220. The rack gear 200 may also be interposed between the rack gear guide track 205 and the pivot gear 210. The rack gear 200 may be free to move along a longitudinal axis 202 of the rack gear 200 except for restraint provided by the driven gear 220 and the pivot gear 210.

When the motor 300 is activated and the driven gear 220 rotates, the driven gear teeth 225 on the driven gear 220 may push against the rack gear teeth 230 and force the rack gear 200 to move in a direction aligned with the longitudinal axis 202 of the rack gear 200. Motion of the rack gear 200 along the longitudinal axis 202 may cause the rack gear teeth 230 to apply force to the pivot gear teeth 235. A force applied to the pivot gear teeth 235 of the pivot gear 210 may cause rotation of the pivot gear 210 and, therefore, rotation of the pivot pin 250. Since the pivot pin 250 is coupled to the distal portion of the wiper arm 410, a force applied to the pivot gear teeth 235 of the pivot gear 210 may cause pivoting of the distal portion of the wiper arm 410 with respect to the proximal portion of the wiper arm 405.

Specifically, when activation of the motor 300 causes the driven gear 220 to rotate in a first driven gear rotational direction 450, the rack gear 200 is forced to move in a first rack gear linear direction 460. When the rack gear 200 moves in the first rack gear linear direction 460, the pivot gear 210 is forced to rotate in a first pivot gear rotational direction 470, resulting in bending of the wiper arm 400 and lifting of the wiper blade 910. When activation of the motor 300 causes the driven gear 220 to rotate in a second driven gear rotational direction 455, the rack gear 200 is forced to move in a second rack gear linear direction 465. When the rack gear 200 moves in the second rack gear linear direction 465, the pivot gear 210 is forced to rotate in a second pivot gear rotational direction 475, resulting in straightening of the wiper arm 400 and lowering of the wiper blade 910.

In some embodiments, the rack gear 200 may be flexible to facilitate moving the rack gear 200 around the angle formed by the proximal portion of the wiper arm 405 and the distal portion of the wiper arm 410 when the wiper blade 910 is lifted away from the windshield 930. In some embodiments, the rack gear 200 may comprise one or more rack gear stops (not illustrated in the figures) at one or both ends of the rack gear 200 to prevent the rack gear 200 from being moved out from under the pivot gear 210 or the driven gear 220.

The rack gear guide track 205 may be a U-shaped channel, a rail, or some other mechanical arrangement that guides and support the rack gear 200. The rack gear guide track 205 may prevent the rack gear 200 from moving towards the rear 420 of the wiper arm 400, away from the pivot gear 210 and the driven gear 220. The rack gear guide track 205 may prevent the rack gear 200 from moving towards the top 425 of the wiper arm 400 or towards the bottom 430 of the wiper arm 400. Movement of the rack gear 200 towards the front 415 of the wiper arm 400 may be prevented by the presence of the pivot gear 210 and the driven gear 220. Movement of the rack gear 200 along the longitudinal axis 202 is prevent by engagement of the rack gear teeth 230 with the pivot gear teeth 235 and with the driven gear teeth 225 and may only be permitted when the driven gear 220 is rotating.

The torsion spring 260 may act to pivot the distal portion of the wiper arm 410 towards the windshield 930. One end of the torsion spring 260 may be coupled to the proximal portion of the wiper arm 405. The other end of the torsion spring 260 may be coupled to the distal portion of the wiper arm 410 either directly or indirectly through another component that is coupled in a fixed manner to the distal portion of the wiper arm 410. As a non-limiting example, the other end of the torsion spring 260 may be coupled to the pivot gear 210 or to the pivot pin 250.

The interior lift control 320 may be an operator control located within a passenger compartment of a vehicle 970. A first activation of the interior lift control 320 may cause power to be applied to the motor 300 with a first polarity, causing the motor 300 to turn the driven gear 220 in the first driven gear rotational direction 450 and resulting in the wiper blade 910 lifting away from the windshield 930. A second activation of the interior lift control 320 may cause power to be applied to the motor 300 with a second polarity, causing the motor 300 to turn the driven gear 220 in the second driven gear rotational direction 455 and resulting in the wiper blade 910 be moved to a position contacting the windshield 930. Each subsequent activation of the interior lift control 320 may toggle between applying power with the first polarity to the motor 300 and applying power with the second polarity to the motor 300, thus alternately lifting the wiper blade 910 away from the windshield 930 and lowering the wiper blade 910 onto the windshield 930.

The invention 100 may comprise a blade lift remote control 500. A receiver 530 located within the vehicle 970 may receive an activation signal 540 from the blade lift remote control 500 and the receiver 530 may operate in cooperation with the interior lift control 320 activate the motor 300 in the first driven gear rotational direction 450 or the second driven gear rotational direction 455.

Specifically, the blade lift remote control 500 may comprise a transmitter 520, one or more batteries (not illustrated in the figures), and a remote activation control 550. Activation of the remote activation control 550 may allow power to be applied to the transmitter 520, resulting in transmission of the activation signal 540. The invention 100 may react to reception of the activation signal 540 by the receiver 530 as equivalent to an activation of the interior lift control 320. Therefore, repeated activations of the remote activation control 550 may result in the wiper blade 910 alternately moving away from the windshield 930 and towards the windshield 930, just as repeated activations of the interior lift control 320 would.

In some embodiments, the blade lift remote control 500 may comprise an indicator 560 to visually indicate that the activation signal 540 is being sent, low battery status, or a combination thereof.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A wiper blade-lifting system comprising:
a wiper arm, a motor, a driven gear, a pivot gear, a rack gear, a pivot pin, a rack gear guide track, a torsion spring and an interior lift control;
wherein activation of the motor causes the wiper arm to hinge at the pivot pin or to straighten;
wherein hinging of the wiper arm results in a wiper blade being lifted away from a windshield;
wherein straightening of the wiper arm results in the wiper blade being brought into contact with the windshield;
wherein lifting the wiper blade away from the windshield preserves the life of the windshield and prevents the wiper blade from becoming stuck to the windshield during icy weather conditions;
wherein the wiper arm comprises a proximal portion of the wiper arm and a distal portion of the wiper arm;
wherein the proximal portion of the wiper arm is coupled to a wiper mounting post which moves in an oscillatory manner driven by a wiper motor and/or a wiper transmission;
wherein the distal portion of the wiper arm couples to the wiper blade via a blade attachment interface;
wherein the proximal portion of the wiper arm and the distal portion of the wiper arm are hingedly coupled to each other at the pivot pin;
wherein the wiper arm has a front, a rear, a top, and a bottom;
wherein the pivot pin is coupled to the top of the distal portion of the wiper arm and to the bottom of the distal portion of the wiper arm;
wherein the pivot pin passes through the top of the proximal portion of the wiper arm and through the bottom of the proximal portion of the wiper arm;
wherein the pivot pin is not coupled to the proximal portion of the wiper arm;
wherein the proximal portion of the wiper arm is free to pivot with respect to the distal portion of the wiper arm;
wherein the motor is coupled to the top of the distal portion of the wiper arm at an interior location of the distal portion of the wiper arm;
wherein wiring provides power to the motor when the wiper blade-lifting system is activated;
wherein the polarity of the applied power determines the direction of rotation of the motor;
wherein the driven gear is coupled to the shaft of the motor;
wherein driven gear teeth at the periphery of the driven gear engage with rack gear teeth on the rack gear;
wherein the pivot gear is coupled to the pivot pin;
wherein pivot gear teeth at the periphery of the pivot gear engage with the rack gear teeth on the rack gear.

2. The wiper blade-lifting system according to claim 1
wherein the rack gear is a linear arrangement of the rack gear teeth;
wherein the rack gear is interposed between the rack gear guide track and the driven gear;
wherein the rack gear is interposed between the rack gear guide track and the pivot gear;
wherein the rack gear is free to move along a longitudinal axis of the rack gear except for restraint provided by the driven gear and the pivot gear.

3. The wiper blade-lifting system according to claim 2
wherein when the motor is activated and the driven gear rotates, the driven gear teeth on the driven gear push against the rack gear teeth and force the rack gear to move in a direction aligned with the longitudinal axis of the rack gear;
wherein motion of the rack gear along the longitudinal axis causes the rack gear teeth to apply force to the pivot gear teeth;
wherein a force applied to the pivot gear teeth of the pivot gear causes rotation of the pivot gear;
wherein rotation of the pivot gear causes rotation of the pivot pin;

wherein a force applied to the pivot gear teeth of the pivot gear causes pivoting of the distal portion of the wiper arm with respect to the proximal portion of the wiper arm.

4. The wiper blade-lifting system according to claim 3 wherein when activation of the motor causes the driven gear to rotate in a first driven gear rotational direction, the rack gear is forced to move in a first rack gear linear direction;

wherein when the rack gear moves in the first rack gear linear direction, the pivot gear is forced to rotate in a first pivot gear rotational direction;

wherein rotation of the pivot gear in the first pivot gear rotational direction results in bending of the wiper arm and lifting of the wiper blade.

5. The wiper blade-lifting system according to claim 4 wherein when activation of the motor causes the driven gear to rotate in a second driven gear rotational direction, the rack gear is forced to move in a second rack gear linear direction;

wherein when the rack gear moves in the second rack gear linear direction, the pivot gear is forced to rotate in a second pivot gear rotational direction;

wherein rotation of the pivot gear in the second pivot gear rotational direction results in straightening of the wiper arm and lowering of the wiper blade.

6. The wiper blade-lifting system according to claim 5 wherein the rack gear is flexible to facilitate moving the rack gear around the angle formed by the proximal portion of the wiper arm and the distal portion of the wiper arm when the wiper blade is lifted away from the windshield.

7. The wiper blade-lifting system according to claim 5 wherein the rack gear comprises one or more rack gear stops at one or both ends of the rack gear to prevent the rack gear from being moved out from under the pivot gear or the driven gear.

8. The wiper blade-lifting system according to claim 5 wherein the rack gear guide track is a mechanical arrangement that guides and support the rack gear;

wherein the rack gear guide track prevents the rack gear from moving towards the rear of the wiper arm, away from the pivot gear and the driven gear;

wherein the rack gear guide track prevents the rack gear from moving towards the top of the wiper arm;

wherein the rack gear guide track prevents the rack gear from moving towards the bottom of the wiper arm;

wherein movement of the rack gear towards the front of the wiper arm is prevented by the presence of the pivot gear and the driven gear;

wherein movement of the rack gear along the longitudinal axis is prevent by engagement of the rack gear teeth with the pivot gear teeth and with the driven gear teeth and is only permitted when the driven gear is rotating.

9. The wiper blade-lifting system according to claim 8 wherein the torsion spring acts to pivot the distal portion of the wiper arm towards the windshield;

wherein one end of the torsion spring is coupled to the proximal portion of the wiper arm;

wherein the other end of the torsion spring is coupled to the distal portion of the wiper arm either directly or indirectly.

10. The wiper blade-lifting system according to claim 9 wherein the other end of the torsion spring is coupled to the pivot gear or to the pivot pin.

11. The wiper blade-lifting system according to claim 9 wherein the interior lift control is an operator control located within a passenger compartment of a vehicle;

wherein a first activation of the interior lift control causes power to be applied to the motor with a first polarity, causing the motor to turn the driven gear in the first driven gear rotational direction and resulting in the wiper blade lifting away from the windshield.

12. The wiper blade-lifting system according to claim 11 wherein a second activation of the interior lift control causes power to be applied to the motor with a second polarity, causing the motor to turn the driven gear in the second driven gear rotational direction and resulting in the wiper blade be moved to a position contacting the windshield.

13. The wiper blade-lifting system according to claim 12 wherein each subsequent activation of the interior lift control toggles between applying power with the first polarity to the motor and applying power with the second polarity to the motor, thus alternately lifting the wiper blade away from the windshield and lowering the wiper blade onto the windshield.

14. The wiper blade-lifting system according to claim 13 wherein the wiper blade-lifting system comprises a blade lift remote control;

wherein a receiver located within the vehicle receives an activation signal from the blade lift remote control;

wherein the receiver operates in cooperation with the interior lift control activate the motor in the first driven gear rotational direction or the second driven gear rotational direction.

15. The wiper blade-lifting system according to claim 14 wherein the blade lift remote control comprises a transmitter, one or more batteries, and a remote activation control;

wherein activation of the remote activation control allows power to be applied to the transmitter, resulting in transmission of the activation signal;

wherein the wiper blade-lifting system reacts to reception of the activation signal by the receiver as equivalent to an activation of the interior lift control;

wherein repeated activations of the remote activation control result in the wiper blade alternately moving away from the windshield and towards the windshield, just as repeated activations of the interior lift control would.

16. The wiper blade-lifting system according to claim 15 wherein the blade lift remote control comprises an indicator to visually indicate that the activation signal is being sent, low battery status, or a combination thereof.

\* \* \* \* \*